(12) United States Patent
Kolbe et al.

(10) Patent No.: US 9,043,136 B2
(45) Date of Patent: May 26, 2015

(54) METHOD FOR DISPLAYING SUITABILITY OF FUTURE WAYPOINT LOCATIONS

(75) Inventors: Dashiell Matthews Kolbe, Grand Rapids, MI (US); Philip Dewing Sugimoto, Rockford, MI (US); Peter Jacob Conrardy, Tampa, FL (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 29 days.

(21) Appl. No.: 13/558,589

(22) Filed: Jul. 26, 2012

(65) Prior Publication Data

US 2014/0032097 A1  Jan. 30, 2014

(51) Int. Cl.
| | |
|---|---|
| G01C 23/00 | (2006.01) |
| G01S 5/00 | (2006.01) |
| G08G 1/087 | (2006.01) |
| G06F 17/30 | (2006.01) |
| G01C 21/00 | (2006.01) |
| G01C 21/34 | (2006.01) |
| G06F 19/00 | (2011.01) |

(52) U.S. Cl.
CPC ............... G01C 23/005 (2013.01); *G01S 5/00* (2013.01); *G08G 1/087* (2013.01); *G06F 17/30* (2013.01); *G01C 21/00* (2013.01); *G01C 21/34* (2013.01); *G06F 19/00* (2013.01)

(58) Field of Classification Search
CPC .......... G08G 1/096861; G08G 1/0969; G08G 1/096827; G08G 1/096872; G08G 1/087; G01C 21/3629; G01C 21/34; G01C 21/00; G06F 19/00; G06F 17/30; G01S 1/00; G01S 19/14
USPC ............... 701/14, 3, 468, 120, 408, 301, 533, 701/428, 467, 2, 25, 117; 340/945; 342/357.48; 707/E17.014
See application file for complete search history.

(56) References Cited

U.S. PATENT DOCUMENTS

| | | |
|---|---|---|
| 6,161,063 A | 12/2000 | Deker |
| 6,424,889 B1 | 7/2002 | Bonhoure et al. |
| 6,577,947 B1 | 6/2003 | Kronfield et al. |
| 7,848,878 B2 | 12/2010 | Cho et al. |
| 7,925,393 B2 | 4/2011 | Bolt, Jr. et al. |
| 2002/0140810 A1* | 10/2002 | Winikka ........................ 348/117 |
| 2008/0114528 A1* | 5/2008 | Seacat et al. ................... 701/117 |
| 2009/0109065 A1 | 4/2009 | Pinheiro |
| 2010/0004798 A1* | 1/2010 | Bodin et al. ........................ 701/2 |
| 2010/0131126 A1* | 5/2010 | He et al. .......................... 701/14 |
| 2010/0250119 A1* | 9/2010 | Cundiff et al. ................. 701/206 |

* cited by examiner

*Primary Examiner* — Behrang Badii
(74) *Attorney, Agent, or Firm* — General Electric Company; William S. Munnerlyn

(57) ABSTRACT

A method for illustrating an aircraft flight plan comprising at least one waypoint on a flight display of a flight deck of an aircraft, where the method may include displaying on the flight display of the flight deck some type of display indicia that indicates the suitability of locations for future waypoints.

23 Claims, 3 Drawing Sheets

METHOD FOR DISPLAYING SUITABILITY OF FUTURE WAYPOINT LOCATIONS

BACKGROUND OF THE INVENTION

Contemporary aircraft may include a flight management system (FMS). The FMS automates a wide variety of in-flight tasks and one of its primary functions is in-flight management of the flight plan. The flight plan may be modeled as a trajectory that can be comprised of a plurality of waypoints. The FMS may be capable of receiving input from a pilot regarding such waypoints but the pilot receives no information related to whether the waypoint added is viable or how the waypoint added may affect future waypoint selections for flight by the aircraft.

BRIEF DESCRIPTION OF THE INVENTION

In one embodiment, the invention relates to a method of illustrating an aircraft flight plan includes displaying on the display a waypoint of the flight plan on a map and displaying on the display indicia, relative to the map, of suitable locations for a future waypoint based on the displayed waypoint.

DESCRIPTION OF EMBODIMENTS OF THE INVENTION

Figure 1:
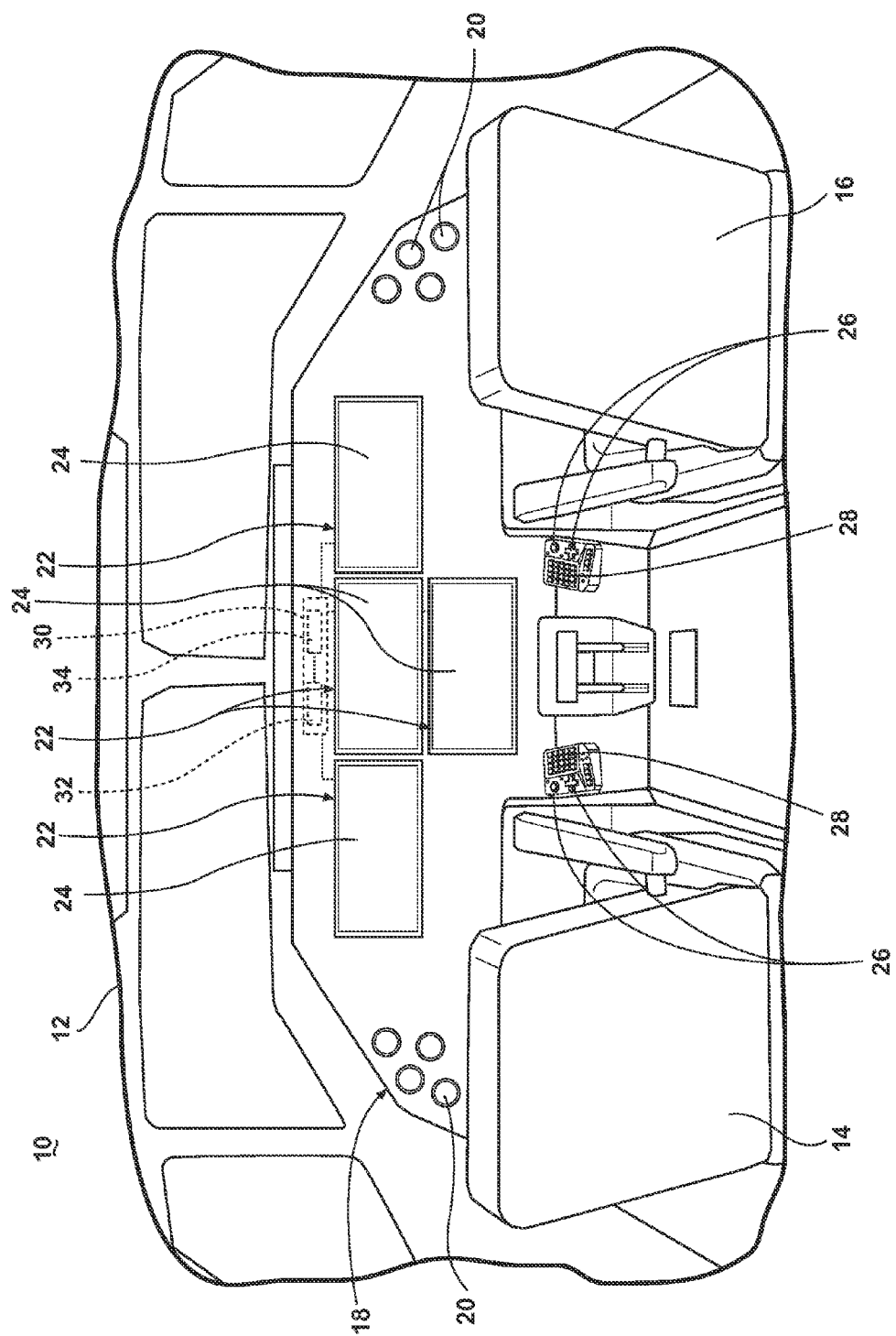
FIG. 1 is a perspective view of a portion of an aircraft cockpit with a flight display on which a portion of a flight plan and display indicia may be displayed according to embodiments of the invention.

FIG. 1 illustrates a portion of an aircraft 10 having a cockpit 12. While a commercial aircraft has been illustrated, it is contemplated that embodiments of the invention may be used in any type of aircraft allowing for a flight plan to be selected and displayed. A first user (e.g., a pilot) may be present in a seat 14 at the left side of the cockpit 12 and another user (e.g., a co-pilot) may be present at the right side of the cockpit 12 in a seat 16. A cockpit instrument panel or flight deck 18 having various instruments 20 and multiple multifunction flight displays 22 may be located in front of the pilot and co-pilot and may provide the flight crew with information to aid in flying the aircraft 10.

The flight displays 22 may include either primary flight displays or multi-function displays and may display a wide range of aircraft, flight, navigation, and other information used in the operation and control of the aircraft 10. The flight displays 22 may be capable of displaying color graphics and text to a user. The flight displays 22 may be laid out in any manner including having fewer or more displays and need not be coplanar or the same size. A touch screen display or touch screen surface 24 may be included in the flight display 22 and may be used by one or more flight crew members, including the pilot and co-pilot, to interact with the systems of the aircraft 10. It is contemplated that one or more cursor control devices 26, such as a mouse, and one or more multifunction keyboards 28 may be included in the cockpit 12 and may also be used by one or more flight crew members to interact with the systems of the aircraft 10.

A controller 30 may be operably coupled to components of the aircraft 10 including the flight displays 22, touch screen surface 24, cursor control devices 26, and keyboards 28. The controller 30 may also be connected with other controllers (not shown) of the aircraft 10. The controller 30 may include memory, the memory may include random access memory (RAM), read-only memory (ROM), flash memory, or one or more different types of portable electronic memory, such as discs, DVDs, CD-ROMs, etc., or any suitable combination of these types of memory. The controller 30 may include processing units, which may be running any suitable programs to implement a graphical user interface (GUI) and operating system. These programs typically include a device driver that allows the user to perform functions on the touch screen surface 24 such as selecting options, inputting commands and other data, selecting and opening files, and moving icons through the touch screen surface 24. The controller 30 may be a portion of an FMS or may be operably coupled to the FMS.

The controller 30 may include a processor 32 and memory 34. A computer searchable database of information may be stored in the memory 34 and accessible by processor 32. The processor 32 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data.

The database may store imagery data that may include geo-specific terrain, man-made objects including runway and airport layouts, and additional imagery including aircraft traffic information. It is contemplated that the database may incorporate a number of databases or that the database may actually be a number of separate databases including a terrain data base, man-made obstacle database, geo-political database, hydrological database, and other databases. It is contemplated that the controller 30 retrieves and displays an image on the display by generating an image from the information and imagery data obtained from the multiple databases. The database may also include runway data, aircraft performance data, engine performance data, current weather conditions, and historical performance data. This data may be stored as performance attributes of the aircraft, geographic constraints, and weather constraints.

Alternatively, it is contemplated that the database may be separate from the controller but may be in communication with the controller 30 such that it may be accessed by either the controller 30. For example, it is contemplated that the database may be contained on a portable memory device and in such a case, the flight deck 18 may include a port for receiving the portable memory device and such a port would be in electronic communication with controller 30 such that controller 30 may be able to read the contents of the portable memory device. It is also contemplated that the database may be updated through a communication link and that in this manner real time information such as information regarding air traffic imagery may be included in the database and may be included in image displayed by the controller 30.

Further, it is contemplated that such a database may be located off the aircraft 10 at a location such as airline or flight operations department control (not shown) or another location and that the controller 30 may be operably coupled to a wireless network (not shown) over which the database information may be provided to the controller 30. For example, the weather data may be obtained from a weather database which may contain real-time weather data or forecasted weather data. Such weather databases may contain information regarding certain weather-related phenomena (e.g., wind speed, wind direction, temperature, among others) and data pertaining to visibility (e.g., foggy, cloudy, etc.), precipitation (rain, hail, snow, freezing rain, etc.) and other meteorological information. Because air temperature, wind direction, and wind speed must be accounted for in trajectory calculations to ensure that the aircraft can accurately conform to the desired trajectory, the weather database may include 3-D real-time temperature and wind models of the local airspace as well as 4-D forecasted data. The weather database may store such real-time or forecasted weather data based at a specific latitude, longitude, and altitude.

Figure 2:
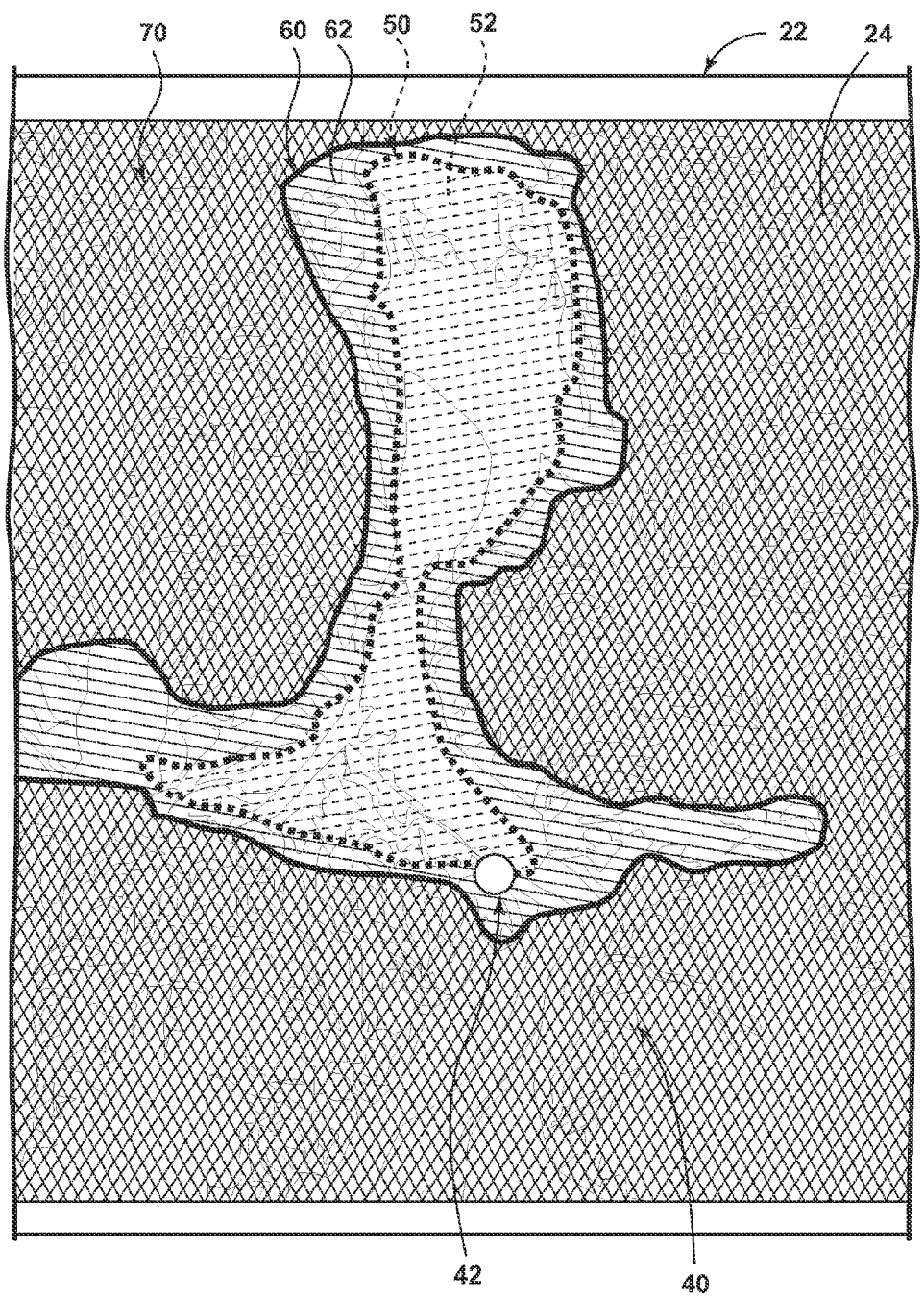
FIG. 2 is a schematic view of display indicia being displayed according to a first embodiment of the invention.

During operation, the controller 30 may utilize inputs from the pilot, the database, and/or information from airline control or flight operations department to present a graphical depiction of the surrounding of the aircraft 10 or a future surrounding of the aircraft 10 based on waypoint or flight plan information. For example, as illustrated in FIG. 2, a map 40 may be displayed on the flight display 22. It will be understood that the map 40 may be graphically illustrated in a variety of ways and that various objects, such as the runway, may be illustrated on the flight display 22 to better aid the pilot in making decisions. Further, the map 40 may take any variety of forms including a 2D map, a 3D map, a topographical map, etc.

Portions of the flight plan including a waypoint 42 may be displayed on the map 40. Further, a current location of the aircraft 10 and/or a current trajectory of the aircraft 10 may be determined and the map 40 or the waypoint 42 may be based thereon. Indicia such as the indicia 50 may be displayed on the flight display 22, relative to the map 40. The indicia 50 may include indicia of suitable locations for a future waypoint based on the displayed waypoint 42.

Among other things, the suitability of future waypoint placement may be determined by the controller 30 based on at least one of weather, terrain, fixed obstacles, variable obstacles, and flight characteristics or performance attributes of the aircraft. In this manner, the controller 30 may generate the indicia to be displayed on the flight display 22 taking into account such information. Embodiments of the invention may use a database of terrain, weather, and additional information to evaluate suitable locations for future waypoint placement. As yet another example, the controller 30 may determine the indicia based on the displayed waypoint 42 and at least one prior waypoint in the flight plan even if such prior waypoint is not illustrated on the flight display 22. The prior waypoint may be a user selected waypoint, a waypoint uploaded from the FMS or airline operations center, the prior waypoint may also include a current location of the aircraft 10. More specifically, the information related to both the displayed waypoint 42 and the prior waypoint may be utilized by the controller 30 to determine the suitability of future waypoint placement. The prior waypoint information may give additional information to the controller 30 to work with related to the heading of the aircraft 10 with respect to the displayed waypoint. More specifically, the controller 30 uses such information in determining the suitability of locations for future waypoint placement. The controller 30 may determine suitability of a future waypoint location by determining if aircraft or airspace parameters would be exceeded if the aircraft 10 traveled the flight plan including the future waypoint.

A pilot's or airline's constraints may also be considered by the controller 30 in determining the suitability of locations for future waypoint placement and generating the indicia. For example, a pilot's flight preferences may be one type of constraint. If the pilot prefers not to fly within a certain range of a mountain, then the controller 30 may utilize such information in determining the suitability of locations for future waypoint placement and generating the indicia. If the constraints would be exceeded for a particular location, then the indicia may indicate that such location is unsuitable.

In implementation, the information or one or more constraints may be converted to an algorithm, which may be converted to a computer program comprising a set of executable instructions, which may be executed by the controller 30, which has access to the waypoints entered into the FMS. In this way, one or more particular waypoints may be compared to the constraints and a determination may be made if the waypoint satisfies the constraints. If so, the waypoint may be considered suitable.

The displayed indicia may define at least one potential area for future waypoint placement. In the illustrated example, the display indicium outlines multiple potential areas for future waypoint placement. For example, a first potential area for future waypoint placement has been outlined as indicia 50. The indicia 50 of the first potential area may indicate that future waypoint placement therein is allowed. The second potential area for future waypoint placement has been outlined as indicia 60. The indicia 60 of the second potential area may indicate that while such a location is capable of being selected for future waypoint placement, the pilot may not want to select such a location for a waypoint. For example, the location may be within a storm front, may intersect with flight plans of other aircraft in the area, may require a steep bank of the aircraft 10, may fall within specialized airspace, as well as other scenarios. Further, the indicia 60 of the second potential area may indicate that the second potential area for future waypoint placement may require an elevation change or some other change in the operational parameters of the aircraft 10.

It is contemplated that in addition to being outlined or in the alternative to being outlined that the displayed indicia may include color-coded indicia to indicate the suitable locations for a future waypoint. For example, red indicium may indicate a location that is not suitable for future waypoint placement and green indicium may indicate a location is suitable for future waypoint placement. Further, yellow indicium may indicate a location that requires some change in the operation of the aircraft. In the illustrated example, the first potential area for future waypoint placement as indicated by indicia 50 includes indicia 52, which may represent a color such as green. The second potential area for future waypoint placement as indicated by indicia 60 includes indicia 62, which may represent a color such as yellow.

The indicia, including color-coded indicia, may also be used to indicate the restrictiveness of the area for future waypoint placement. In the illustrated example both the first potential area for future waypoint placement as indicated by indicia 50 and the second potential area for future waypoint placement as indicated by indicia 60 may include allowed areas for future waypoint placement. The indicia 50 and the indicia 60 may be differentiated by a restrictiveness of future waypoint placement. For example, the indicia 50 may outline an area where future waypoint placement would be less restrictive than the area outlines by the indicia 60.

The indicia may also indicate an area that is not suitable for future waypoint placement, such as the indicia 70. For example, the indicia 70 may be generated because the area indicated by the indicia 70 may be restricted air space or the aircraft 10 may be incapable of reaching the area indicated by the indicia 70 because of terrain, weather, or the flight characteristics or performance attributes of the aircraft 10. Any suitable indicia may be used to indicate the unsuitable area including that the area may also be labeled as unsuitable on the flight display 22. Further, the area may be greyed out or color coded, such as with the color red, to indicated the unsuitability of the area. Further, the controller 30 may block out the area from future waypoint placement.

It is further contemplated that emergency options for future waypoint placement may be indicated by indicia on the flight display 22. Such emergency options may be otherwise unsuitable for selection but may be indicated as suitable should an emergency occur.

Figure 3:
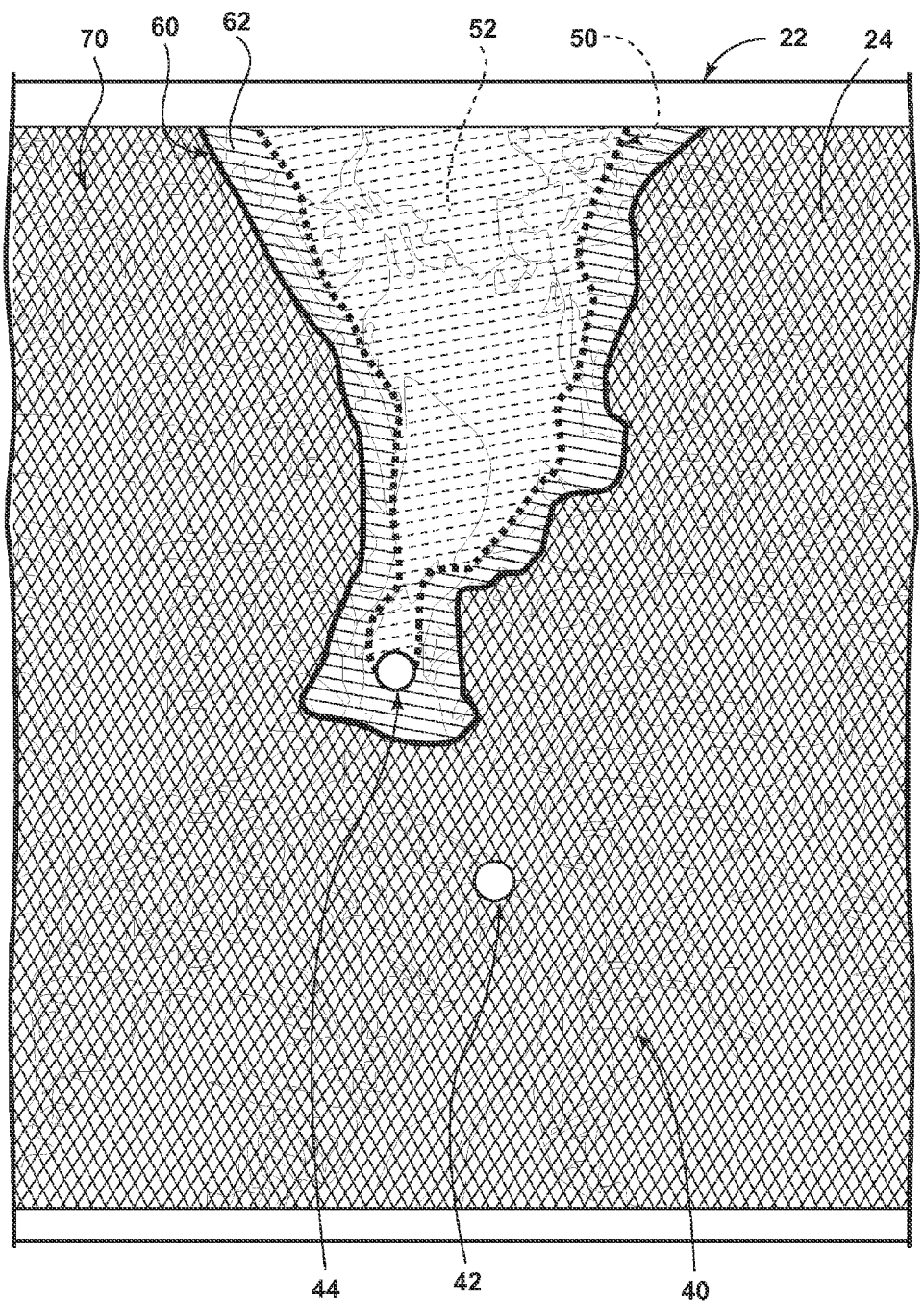
FIG. 3 is a schematic view of updated display indicia being displayed according to an embodiment of the invention.

Referring now to FIG. 3, it is contemplated that a user may select a waypoint, such as the illustrated waypoint 44 and that such selection may be received by the controller 30 and the controller 30 may then display such selected waypoint 44 on the flight display 22 and update the indicia based thereon. It is contemplated that the user may input the selected waypoint 44 by touching the location on the touchscreen 24 forming the flight display 22, by selecting the location using the cursor control devices 26, or by using the multifunction keyboards 28. When the waypoint is chosen, the controller 30 updates the indicia to provide the user with a visual representation of the suitability of those areas for future waypoints based upon the waypoint being entered. For example, the indicia 50, 52, 60, 62, and 70 have all been updated based on the selection of the waypoint 44. Although not illustrated, the graphical display of the map 40 on the flight display 22 may also be updated. For example, the graphical display of the map 40 may be shifted so that the pilot may see additional or alternative portions of the map 40.

It is also contemplated that the user may select or input a waypoint and then move the waypoint with respect to the depiction on the flight display 22. The controller 30 may update the displayed indicia in accordance with the movement of the waypoint. This may allow the user to find the best suitable waypoint in terms of their future route choice.

Although three separate areas have been illustrated for exemplary purposes it will be understood that any number of indicia may be included on the flight display 22. Further the indicia may include any number of graphical or illustrative methods while allowing the pilot to arrive at the same conclusion as to the suitability of future waypoint placement.

The above described embodiments provide a variety of benefits including that the displayed information may provide the pilot foresight into what waypoints will allow them the most freedom in terms of a desired flight plan as the pilot is making the flight plan. For example, the pilot is provided with waypoint information, map information, and indicia from which the pilot may assess the viability and rank the effectiveness of waypoint choices. Such a graphical representation may be based on the inputted waypoints as well as terrain, weather, and other information such as flight characteristics that may affect the suitability of future waypoint locations. This may allow the flight crew to recognize any issues with waypoints being selected in terms of terrain, weather, and other flight characteristics. The above embodiments simplify the pilot interface and allow for time savings in that the user does not have to manually account for this data in selecting a flight plan.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of illustrating an aircraft flight plan comprising at least one waypoint on a display of a flight deck of an aircraft, the method comprising:
    displaying, by a controller having a processor, on the display a waypoint of the flight plan on a map;
    determining, by a controller having a processor, a suitability of locations for future waypoint placement based on the location of the displayed waypoint; and
    altering the display, by a controller having a processor, to include indicia overlying the map to illustrate suitable locations for future waypoint placement based on the determined suitability.

2. The method of claim 1, wherein the map depicts surroundings of the aircraft.

3. The method of claim 2, wherein displaying the map comprises at least one of the controller determining a current location of the aircraft and the controller determining a current trajectory of the aircraft and displaying the map based thereon.

4. The method of claim 1 wherein the determining the suitability is also based on at least one prior waypoint.

5. The method of claim 4 wherein the prior waypoint is a user selected waypoint.

6. The method of claim 4 wherein the prior waypoint is a current location of the aircraft.

7. The method of claim 1 wherein the displayed indicia comprises color-coded indicia.

8. The method of claim 1 wherein a red indicium indicates a location is not suitable and a green indicium indicates a location is suitable.

9. The method of claim 1 wherein the displayed indicia defines an at least one potential area for future waypoint placement.

10. The method of claim 9 wherein the displayed indicia outlines the at least one potential area for future waypoint placement.

11. The method of claim 10 wherein the displayed indicia outlines multiple potential areas for future waypoint placement.

12. The method of claim 11 wherein the multiple potential areas for future waypoint placement are differentiated by a restrictiveness of future waypoint placement.

13. The method of claim 9 wherein the displayed indicia blocks out at least one potential area for future waypoint placement.

14. The method of claim 9 wherein the at least one potential area for future waypoint placement comprises an allowed area for future waypoint placement.

15. The method of claim 1 wherein determining the suitability further comprises determining whether the future waypoint placement location exceeds at least one of an aircraft or an airspace parameter.

16. The method of claim 1, wherein the displaying on the display a waypoint comprises receiving a selected waypoint from a user and displaying the selected waypoint.

17. The method of claim 16 wherein the receiving the selected waypoint comprises the controller receiving at least one of a selection input from a touchscreen forming the display and a selection input from a mouse operably coupled to the display.

18. The method of claim 16 wherein the receiving the selected waypoint comprises a user selecting a waypoint and moving the waypoint with respect to the map.

19. The method of claim 18, further comprising updating, by the controller, the indicia to reflect the moved waypoint.

20. The method of claim 1 wherein the displayed indicia indicates an area that is not suitable for future waypoint placement.

21. A method of illustrating an aircraft flight plan on a flight display of a flight deck of an aircraft, the method comprising:
   determining, by a controller having a processor, at least one waypoint of the flight plan;
   determining, by a controller having a processor, a suitability of locations for future waypoint placement based on the location of the determined waypoint and at least one of weather, terrain, fixed obstacles, variable obstacles, and flight characteristics of the aircraft; and
   altering the display, by a controller having a processor, to include indicia illustrating suitable locations for future waypoint placement based on the determined suitability.

22. The method of claim 15 wherein the determination of whether the aircraft or airspace parameter is exceeded is based on information pertaining to weather, terrain, fixed obstacles, variable obstacles, or flight characteristics of the aircraft.

23. The method of claim 15 wherein the determining the suitability further comprises utilizing real time data collected by the aircraft.

\* \* \* \* \*